US008054956B2

(12) United States Patent
Cai

(10) Patent No.: US 8,054,956 B2
(45) Date of Patent: Nov. 8, 2011

(54) FLEXIBLE RECHARGE SYSTEM FOR PREPAID TELECOMMUNICATIONS SERVICE

(75) Inventor: Yigang Cai, Naperville, IL (US)

(73) Assignee: Alcatel Lucent, Paris (FR)

( * ) Notice: Subject to any disclaimer, the term of this patent is extended or adjusted under 35 U.S.C. 154(b) by 1355 days.

(21) Appl. No.: 11/644,764

(22) Filed: Dec. 22, 2006

(65) Prior Publication Data

US 2008/0152106 A1  Jun. 26, 2008

(51) Int. Cl.
*H04M 15/00* (2006.01)
(52) U.S. Cl. .............................. 379/114.2; 379/114.16
(58) Field of Classification Search ............ 379/114.15, 379/114.16, 114.18, 114.2, 144.01; 455/405, 455/406; 705/39, 40
See application file for complete search history.

(56) References Cited

U.S. PATENT DOCUMENTS

| 7,346,154 | B1 * | 3/2008 | Andresen et al. ........ 379/114.16 |
| 2004/0172362 | A1 * | 9/2004 | Hausmann et al. ............. 705/41 |
| 2004/0185827 | A1 * | 9/2004 | Parks ............................ 455/406 |
| 2006/0262914 | A1 * | 11/2006 | Cai ........................... 379/114.16 |

* cited by examiner

*Primary Examiner* — Quoc D Tran
(74) *Attorney, Agent, or Firm* — Werner Ulrich, Esq.

(57) ABSTRACT

This invention relates to a method and apparatus for handling prepaid recharge requests in a telecommunications network. If the prepaid recharge request results in exceeding a recharge cap, the requesting customer is provided with one or more alternative rewards, such as bonus points for making a limited class of calls, for the excess beyond the cap. Advantageously, the service provider and service resellers can provide incentives to customers to continue to use the maximum amount of service without removing restrictions on a cap or the time limit by which prepaid services must be used.

18 Claims, 2 Drawing Sheets

FLEXIBLE RECHARGE SYSTEM FOR PREPAID TELECOMMUNICATIONS SERVICE

TECHNICAL FIELD

This invention relates to a method and apparatus for providing flexible recharge arrangements for prepaid telecommunications services.

BACKGROUND OF THE INVENTION

Telecommunications services can be paid for on either a prepaid basis or postpaid basis. For conventional postpaid services, a telecommunications carrier maintains a record of telecommunications services provided to a customer and periodically (e.g., monthly) sends a bill to the customer for the value of the services provided to the customer during the previous billing period.

In contrast, prepaid services require a customer to pay for service ahead of time by transferring a prepaid amount to the customer's balance. The service provider keeps track of the amount that the customer has prepaid and charges for telecommunications services against the balance in the customer's account. When the balance reaches zero the service provider, in general, stops providing service to that customer. In some cases, based on the subscriber account type and configuration, the service provider allows overcharging, i.e., a balance below zero. The overcharging amount is configurable. When the customer overcharges, the balance will show a negative amount.

Prepaid services are popular for customers who cannot obtain credit and/or for customers who are offered more service per dollar with a prepaid account than they can obtain with a conventional postpaid account. For example, a retailer or reseller (hereinafter, reseller) such as Walmart may offer $125 worth of telecommunications charges for $100; the customer buys a scratch card for $100 from Walmart, and provides the data identifying the customer to a telecommunications carrier. The data comprises a scratch card number and a personal identification number (PIN). The card number is printed on the face and the PIN is covered with a plastic film. The customer must scratch the plastic cover to get the PIN, then use both the scratch card number and the PIN to recharge, and the telecommunications carrier initializes the customer's account with the equivalent of $125 worth of services.

A customer dials a 1-800 code to reach the service provider, and provides the card number and PIN to the service provider. The recharge management system can search the database to verify the scratch card and read the face value which is stored in the database. Then the prepaid system converts the face value to units, such as minutes of air time, and adds these units to the customer account. The service provider decrements the number of units in the customer's account as the customer uses the telecommunications services of the service provider.

In part because so many of the prepaid services are tied to promotions, most prepaid services have limits as to the amount that a customer can prepay and store an expiration date by which the prepaid services must be used. For customers who regularly use prepaid services and add to their account when necessary, i.e., when the customer's balance goes to zero or the expiration date is reached, or before, the expiration date is adjusted when the customer adds to his/her prepaid account in accordance with a formula based on the current balance and the increment of the recharge. However, if a customer provides a recharge amount which will cause his/her balance to exceed a maximum (cap) for that customer, the excess is retained (confiscated) by the service provider.

A problem of the prior art is that there is a need for greater flexibility in treating recharge amounts that cause a customer's balance to exceed the balance cap.

SUMMARY OF THE INVENTION

The above problem is solved and an advance is made over the teachings of the prior art in accordance with this invention wherein the service provider stores a class of service for each prepaid customer account; then, when a customer enters a recharge amount which causes the balance cap to be exceeded, the prepaid customer's charging class of service is consulted and one or more of the following adjustments is made as a reward to the customer, and to compensate partially or fully for possible lost increments of paid for service:

1. A portion up to some limit of the recharge excess is allowed and the customer's balance is adjusted to exceed the cap by that amount.
2. Bonus points which can be used for a limited class of telecommunications services (e.g., calls which stay in the caller's home area) are awarded; for these calls, the bonus points can be used before the main account of the customer is debited. Bonus points can be converted from excess recharge amounts.
3. The expiration date for service provided from the customer's balance is extended beyond the regular limit for a recharge to the balance cap.
4. Customer loyalty records may be updated for future benefits and promotion.

Advantageously, with this type of arrangement, a judicious choice of parameters by the service card vendor and/or the service provider can achieve the goal of providing additional service to the customer who has exceeded his/her charge cap without substantially decreasing the incentive of the customer to use a maximum amount of telecommunications service.

In accordance with one specific embodiment of Applicant's invention, the parameters which determine the disposition of excess recharge amounts, and which are stored as part of the prepaid customer class of service, are under the control of the reseller of the prepaid service. Advantageously, these parameters can be part of the promotional arrangement of that vendor.

DETAILED DESCRIPTION

Figure 1:
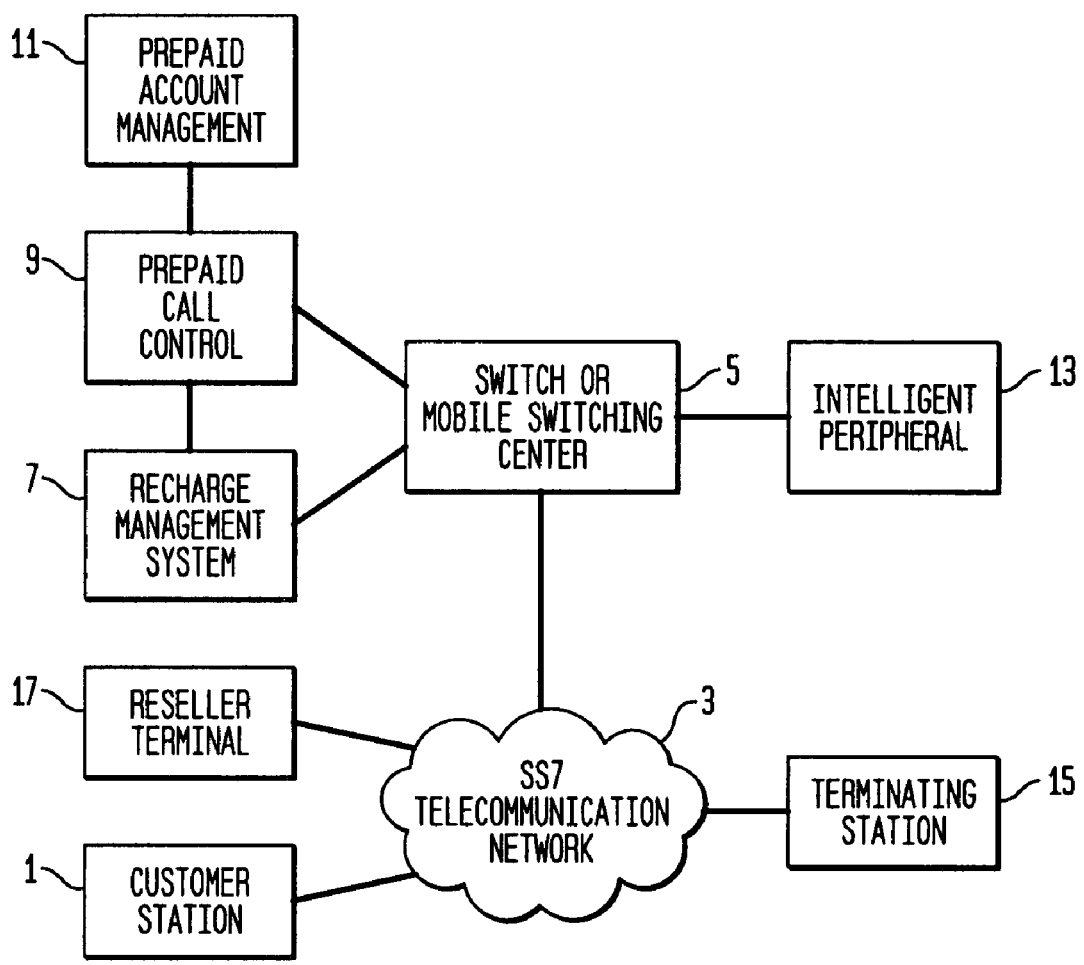
FIG. 1 is a block diagram illustrating the operation of Applicant's invention.

FIG. 1 is a block diagram illustrating the operation of Applicant's invention. A customer at a telecommunications station such as station 1, which may be a mobile station, is connected via an SS7 public switched telecommunications network 3 to a land line switch (switch) or mobile switching center (MSC) 5. Calls from customer 1 to a terminating customer 15 are routed from the customer 1 via the SS7 network 3 to the terminating customer. When customer 1 wishes to recharge his/her account, he/she first dials the 1-800 number for the recharge service; a switch or MSC 5 will route the call to the recharge management system 7. The recharge management system controls the prompting of the customer via an intelligent peripheral 13, and will collect the recharge information from the customer 1. The recharge management system will verify the customer's recharge card within the database of the recharge management system for card number and personal identity number (PIN), and will then figure out the face value and promotion value of the card. The recharge management system also verifies the customer prepaid account within the prepaid call control system 9, to determine whether it is allowed to recharge, and to transfer the full recharge amount to the prepaid account. After the recharge, the prepaid service system will update the account balance (in call units) in the prepaid call control system; and reset the prepaid lifecycle—expiration and next recharge dates.

When a customer enters a recharge request, the switch or MSC 5 calls on recharge system 7 to alert a prepaid call control system 9 which deals with an account management system 11. The account management system updates the customer's prepaid account whenever there is a recharge. It is the account management system which adjusts a customer's prepaid account and expiration/next recharging dates and bonus point account in accordance with the principles of Applicant's invention. The account management system also stores the class of prepaid service for the customer. The prepaid call control 9 is then used to debit the customer's account in the account management system as the customer uses telecommunications services. An intelligent peripheral 13 is used, for example, to generate announcements back to customer 1 in order to guide that customer when that customer requests a recharge, and to collect information supplied by the customer.

A reseller at a reseller terminal 17 can access the customer's class of service stored in the account management system via the network 3, switch or MSC 5, and recharge management system 7. The reseller can change the class of service when appropriate. For example, the reseller can change the cap if a delinquent customer pays a bill.

Figure 2:
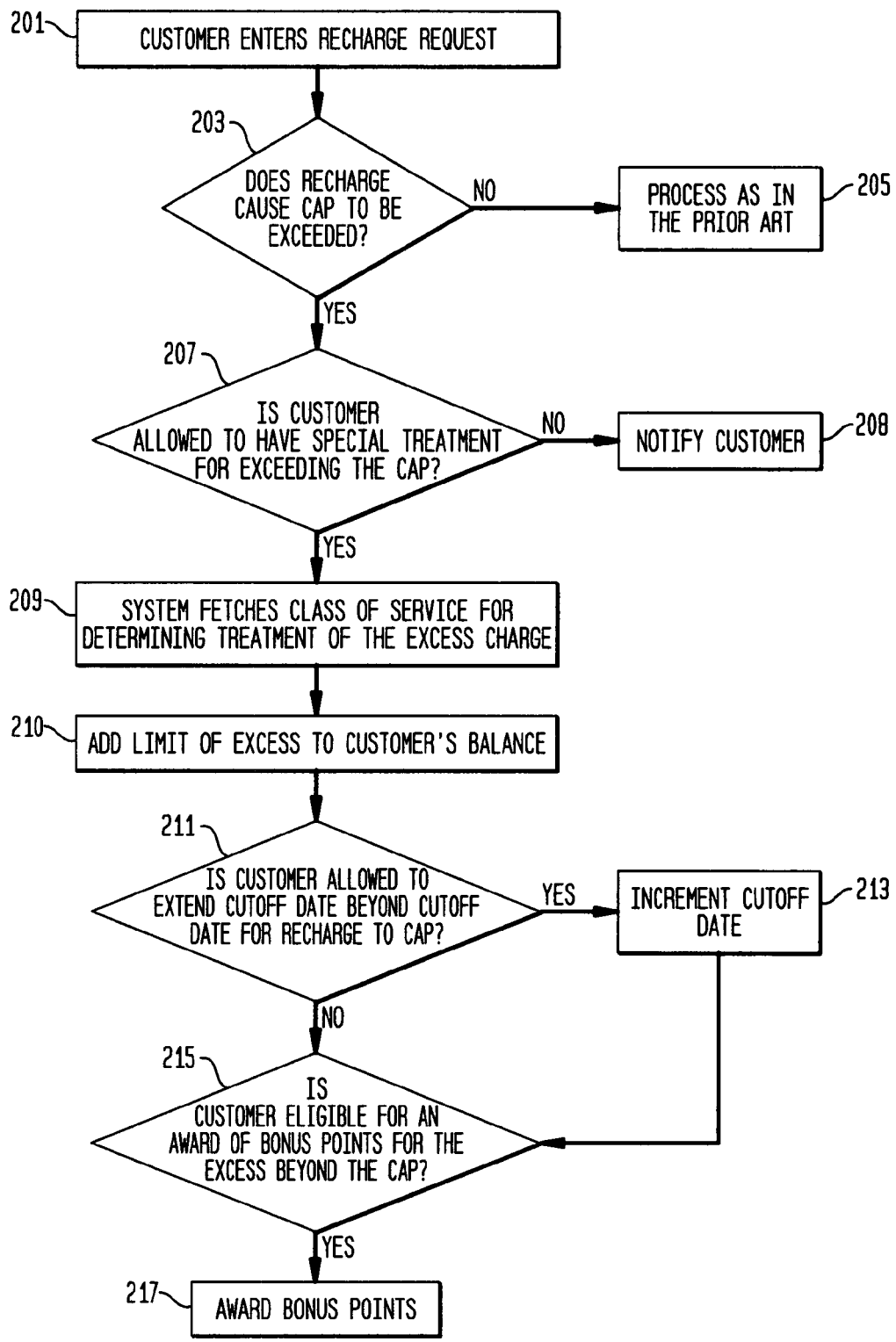
FIG. 2 is a flow diagram illustrating the method of Applicant's invention.

FIG. 2 is a flow diagram illustrating the operation of Applicant's invention. A customer enters a recharge request (action block 201). The account management system then determines whether the recharge request causes the customer to exceed that customer's cap (test 203). If not, then the recharge is processed as in the prior art (action block 205).

If the recharge causes the cap to be exceeded then test 207 determines whether the customer is allowed to have special treatment if he exceeds the cap. If no special treatment is allowed, the system will notify the customer (action block 208). The system will notify the customer that he/she is exceeding the cap of the account and how much will be confiscated. If the customer agrees to the cap and confiscated amount, the system will process the recharge request as in the prior art: the account is set to the maximum and the rest of the recharge money is confiscated. In case the recharge request is based on a credit card, the customer can request that only the amount necessary to reach the cap be accepted by the system.

The system will check the class of service of the customer to determine whether the customer is entitled to special treatment if the recharge request would cause the customer's balance to exceed the cap. If the customer is allowed to exceed the cap, in accordance with the principles of this invention, the class of service determines the treatment of the excess charge (action block 209). After the customer's class of service has been determined, the amount that the customer is allowed to exceed the cap is added to the cap up to the limit of the recharge amount (action block 210). Test 211 determines whether the customer is allowed to extend the cutoff date beyond the cutoff data for a recharge beyond the cap; if so, the cutoff date is incremented (action block 213). Test 215 determines whether the customer is eligible for bonus points; if so, then bonus points are awarded (action block 217).

The excess recharging amount, extension of expiration/next recharge dates, and bonus points will be determined by the customer's class of service. The rules, based on the class of service, to determine the qualification can include but need not be limited as follows:

1. Subscriber identity and account status. Special treatment can be provided, for example, to VIP subscribers, new subscribers (for example, subscribed for the service within two months), corporate subscribers, reseller or service provider employees. For instance, when a service provider employee recharges his account, the excess value will be converted to units, except if an additional excess cap is reached; when a reseller employee recharges his account, the excess value will be all converted to bonus point; when a new subscriber recharges his account, 50% of that excess value will be converted to bonus points and 50% will be confiscated.
2. Recharge methods, such as cash (in a reseller store), scratch card, credit card, bank card, internet online recharge, and retail store recharge can modify the treatment of excess recharges. For instance, the service provider may only allow the excess cap for scratch card customers because it is very difficult to reduce an excess recharge when the scratch card face values are fixed.
3. Recharge date and time which link to subscriber account lifecycle can modify the treatment of excess charges. For example, if the subscriber lifecycle is near the recharging warning stage, more flexibility is granted, such as a higher limit on the balance cap. Also, a holiday recharge (as a promotion), may allow a greater balance cap.
4. Recharge amount rules: a larger amount in the recharge can increase the balance cap. For example, a $50 balance cap excess can be allowed for a recharge amount of $100, and a $75 balance cap excess can be allowed for a recharge amount of $200.
5. Percentage of confiscated amount rule. More money is confiscated, but a longer extension of expiration/next recharge days is allowed, and/or more bonus points are credited if the excess over the recharge cap is greater.

The recharge management system will check the subscriber identity and account status whether the subscriber is eligible for a flexible maximum recharge and determine how the subscriber class of service will affect the final balance cap. If the subscriber is not entitled to a flexible recharge (hard account), the service logic will execute a prior art recharge and confiscate excess recharge amounts and retain the maximum balance in the account.

Special reseller subscribers can be allowed special flexible recharge rules as a promotion. For example, Disney subscribers will be allowed a promotion, but Apple subscribers will not.

Special rules for customers of specific resellers or even all customers can be allowed. These special rules can override an individual customer's class of service rules. This is valuable for temporary broad promotions. These rules can be static (permanent until changed) or dynamic (for a particular date and/or time interval). The special rules can be arranged to be invoked only if the rule gives a customer more favorable treatment than that offered by the customer's class of service.

The above description is of one preferred embodiment of Applicant's invention.

I claim:

1. A method of handling recharge requests for a customer having prepaid telecommunications service, provided by a carrier but sold through a reseller, comprising the steps of:

storing a prepaid class of service for said customer under the control of said reseller;

testing whether a recharge causes a customer's account to exceed a cap for that customer;

if the recharge amount causes the customer to exceed the cap, examining said class of service of said customer to determine a treatment for an excess of said recharge beyond said cap.

2. The method of claim 1 wherein said reward comprises an addition to the customer's balance beyond the cap.

3. The method of claim 1 wherein said reward comprises adding to a balance use cutoff date for said customer.

4. The method of claim 1 wherein said reward comprises bonus points for use in providing a limited class of telecommunications service.

5. The method of claim 4 wherein said limited class of telecommunications service comprises calls to the caller's home area.

6. The method of claim 1 further comprising the step of:
accessing said class of service from a terminal of a reseller.

7. The method of claim 6 wherein the step of accessing comprises the step of changing said cap.

8. The method of claim 1 wherein said class of service comprises data on said customer's subscriber identity and account status.

9. The method of claim 8 wherein said customer's subscriber identity comprises data for identifying reseller or service provider employees.

10. The method of claim 1 wherein said treatment for an excess comprises static rules for establishing minimum levels of said alternative rewards.

11. The method of claim 10 wherein said static rules comprise rules based on method of payment of a recharge amount.

12. The method of claim 1 wherein said treatment for an excess comprises dynamic rules based on date of a recharge request.

13. Apparatus for handling recharge requests for a customer having prepaid telecommunications service provided by a carrier but sold through a reseller, comprising:

means for storing a prepaid class of service for said customer under the control of said reseller;

means for detecting whether a recharge causes a customer's account to exceed a cap for that customer;

means, responsive to detecting that the recharge amount causes the customer to exceed the cap, for examining said class of service of said customer to determine a treatment for an excess of said recharge beyond said cap.

14. The apparatus of claim 13 wherein said reward comprises an addition to the customer's balance beyond the cap.

15. The apparatus of claim 13 wherein said reward comprises adding to a balance use cutoff date for said customer.

16. The apparatus of claim 13 wherein said reward comprises bonus points for use in providing a limited class of telecommunications service.

17. The apparatus of claim 13 further comprising:
a terminal of a reseller; and
means for accessing said class of service from said terminal of a reseller.

18. The apparatus of claim 17 wherein said means for accessing comprises means for changing said cap.

* * * * *